US009104208B2

(12) United States Patent
Vasquez et al.

(10) Patent No.: US 9,104,208 B2
(45) Date of Patent: Aug. 11, 2015

(54) REGULATOR WITH BLEED VALVE

(75) Inventors: Ernesto Vasquez, McKinney, TX (US); Sheryl L. Daake, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 409 days.

(21) Appl. No.: 13/558,960

(22) Filed: Jul. 26, 2012

(65) Prior Publication Data
US 2013/0042931 A1 Feb. 21, 2013

Related U.S. Application Data

(60) Provisional application No. 61/525,456, filed on Aug. 19, 2011.

(51) Int. Cl.
| G05D 16/08 | (2006.01) |
| G05D 16/16 | (2006.01) |
| G05D 16/06 | (2006.01) |
| F16K 24/04 | (2006.01) |
| G05D 7/03 | (2006.01) |
| F16K 24/02 | (2006.01) |

(52) U.S. Cl.
CPC .............. G05D 16/16 (2013.01); F16K 24/02 (2013.01); F16K 24/04 (2013.01); G05D 7/03 (2013.01); G05D 16/0694 (2013.01)

(58) Field of Classification Search
CPC ......... F16K 24/02; F16K 24/04; G05D 16/16; G05D 16/0106; G05D 16/163; G05D 16/0694; G05D 7/03; G05D 7/0106
USPC .............. 137/505, 505.11, 505.14, 505.21, 137/505.22, 197–202
IPC .............. G05D 7/03,7/0106, 16/16, 16/0106, G05D 16/163, 16/0694; F16K 24/02, 24/04
See application file for complete search history.

(56) References Cited

U.S. PATENT DOCUMENTS

| 1,720,673 | A | * | 7/1929 | Groble | 137/254 |
| 1,814,530 | A | * | 7/1931 | Paulsen | 137/489 |
| 2,115,512 | A | * | 4/1938 | Vincent | 137/71 |
| 2,147,850 | A | * | 2/1939 | Maclean | 137/71 |

(Continued)

OTHER PUBLICATIONS

International Search Report for International Application No. PCT/US2012/051190, mailed Dec. 4, 2012.

(Continued)

*Primary Examiner* — William McCalister
(74) *Attorney, Agent, or Firm* — Marshall, Gerstein & Borun LLP

(57) ABSTRACT

A process fluid regulator includes a regulator body having a fluid inlet and a fluid outlet connected by a fluid flow path. A control element is disposed within the fluid flow path, the control element cooperating with a seat to control fluid flow through the regulator body. An actuator is attached to the regulator body, the actuator providing force to move the control element relative to the seat. The actuator includes a housing and a diaphragm within the housing, the diaphragm dividing the actuator housing into an upper chamber and a lower chamber. A high pressure bleed valve is attached to the lower chamber to vent residual gas from the lower chamber, which creates additional volume for process liquid in the lower chamber. This additional volume improves effectiveness and response time of the process fluid regulator.

14 Claims, 1 Drawing Sheet

(56) References Cited

U.S. PATENT DOCUMENTS

| | | | | |
|---|---|---|---|---|
| 2,302,284 A | * | 11/1942 | Abbott | 137/526 |
| 2,347,586 A | * | 4/1944 | Whitworth | 137/507 |
| 2,357,777 A | * | 9/1944 | White | 62/48.1 |
| 2,487,650 A | * | 11/1949 | Grove et al. | 137/505.11 |
| 2,793,075 A | * | 5/1957 | Gulick, Jr. | 239/126 |
| 3,259,274 A | * | 7/1966 | Klasson et al. | 222/48 |
| 3,367,109 A | | 2/1968 | Troeger et al. | |
| 4,606,258 A | | 8/1986 | Kauss | |
| 5,595,209 A | | 1/1997 | Atkinson et al. | |

OTHER PUBLICATIONS

Written Opinion for International Application No. PCT/US2012/051190, mailed Dec. 4, 2012.

* cited by examiner

REGULATOR WITH BLEED VALVE

RELATED APPLICATIONS

This application claims priority benefit of U.S. Provisional Application No. 61/525,456 filed on Aug. 19, 2011, the entirety of which is hereby incorporated by reference herein.

FIELD OF THE INVENTION

The present invention relates generally to process fluid regulators and, more specifically, to process fluid regulators having an actuator including a high pressure bleed valve that purges gas trapped beneath a diaphragm within the actuator, when the actuator is installed in an upright position, to allow a greater volume of control liquid to pressurize one chamber of the actuator.

BACKGROUND

Process fluid regulators are used throughout industry to control fluid flow within process systems. Generally, process fluid regulators include a regulator body having a fluid inlet and a fluid outlet connected by a fluid flow passage. A movable control element, such as a plug, cooperates with a seat to vary a size of an opening within the fluid flow passage, which controls the flow of process fluid through the process fluid regulator. Actuators are attached to the regulator body and connected to the control element to operatively control a position of the control element with respect to the seat. Actuators can include a housing and a diaphragm disposed within the housing, the diaphragm dividing the inside of the housing into at least to chambers. The diaphragm is connected to the control element by an actuator stem so that the control element moves in conjunction with the diaphragm. A control spring biases the diaphragm to a desired position, which biases the control element to a desired position (i.e., to an open position or a closed position). Process fluid pressure (either upstream of the control member or downstream of the control member) may be used as an input to the actuator to offset or overcome spring force generated by the control spring. The actuator uses the input process fluid pressure to adjust the position of the control element (by way of the diaphragm and stem) to maintain a desired downstream process fluid pressure. In this way, the process fluid regulator "regulates" the downstream pressure of the process fluid.

In some systems, the process fluid is a liquid that is flowing through the system at high pressure. When a high pressure process liquid is used as an input to the actuator of a process fluid regulator, residual gas may become trapped in one of the chambers, thereby reducing the available volume within the chamber for the process liquid. This is especially true when the process fluid regulator is installed in an upright orientation, with the actuator located above the regulator body. A reduction in available volume may reduce actuator effectiveness and thus, the effectiveness of the process fluid regulator itself.

SUMMARY

In accordance with one exemplary aspect, a process fluid regulator assembled in accordance with the teachings disclosed herein includes a regulator body having a fluid inlet and a fluid outlet connected by a fluid flow path. A control element is disposed within the fluid flow path, the control element cooperating with a seat to control fluid flow through the regulator body. An actuator is attached to the regulator body, the actuator providing force to move the control element relative to the seat. The actuator includes a housing and a diaphragm within the housing, the diaphragm dividing the actuator housing into an upper chamber and a lower chamber. A high pressure bleed valve is attached to the lower chamber to vent residual gas from the lower chamber, which creates additional volume for process liquid in the lower chamber. This additional volume improves effectiveness and response time of the process fluid regulator.

In further accordance with the foregoing exemplary aspect, a process fluid regulator may further include any one or more of the following preferred forms.

In some preferred forms, the process fluid regulator may be configured with the high pressure bleed valve being connected to an inlet tap located in the lower chamber. The inlet tap may be located at an intermediate position within the lower chamber so that the diaphragm cannot roll over the inlet tap. The bleed valve may include a vent tube that is oriented away from the upper chamber. The bleed valve may include one or more of an inlet tap plug having a central bore and a transverse bore, a vent screw at least partially disposed in the central bore, a vent tube at least partially disposed in one end of the transverse bore, and a back stop screw at least partially disposed in another end of the transverse bore. The vent tube may be hollow, forming a fluid flowpath for fluid to flow out of the lower chamber. The vent screw may include a plug at one end, the plug cooperating with a shoulder formed in the central bore to control fluid flow through the central bore and out of the vent tube. The vent screw may include an annular flange extending outward between the plug and a head of the vent screw. A recessed area may be formed on a shank of the vent screw between the annular flange and the head. The back stop screw may include a reduced diameter end, the reduced diameter end being located at least partially within the recessed area. The reduced diameter end may be approximately ½ the size of the recessed area. The diaphragm may be connected to the actuator stem with a diaphragm plate and a diaphragm head, the diaphragm being at least partially located between the diaphragm plate and the diaphragm head. The diaphragm head may form a stop that limits movement of the diaphragm towards the seat so that the diaphragm is prevented from rolling over the inlet tap. The diaphragm head may have a thickness that is approximately 75% of the distance between an upper end of the lower chamber and a lower end of the lower chamber. The upper chamber may include a vent and the lower chamber may include a lower control inlet, the vent forming a fluid flow path into, and out of, the upper chamber and the lower control inlet forming a fluid flow path into, and out of, the lower chamber, the lower control inlet being fluidly connecting the lower chamber with process fluid downstream of the control element.

DETAILED DESCRIPTION OF AN EXEMPLARY EMBODIMENT

Generally, process fluid regulators regulate downstream pressures of a process fluid by using either an upstream process fluid pressure or a downstream process fluid pressure as an input to an actuator. Process fluid pressure may be registered through a control line connection located in an actuator housing. When the input process fluid pressure rises above a set pressure, process fluid pressure within the actuator increases and overcomes a control spring force to move a control element. Once input process fluid pressure falls below the set pressure, the control spring force overcomes the process fluid pressure, moving the control element in an opposite direction.

Figure 1:
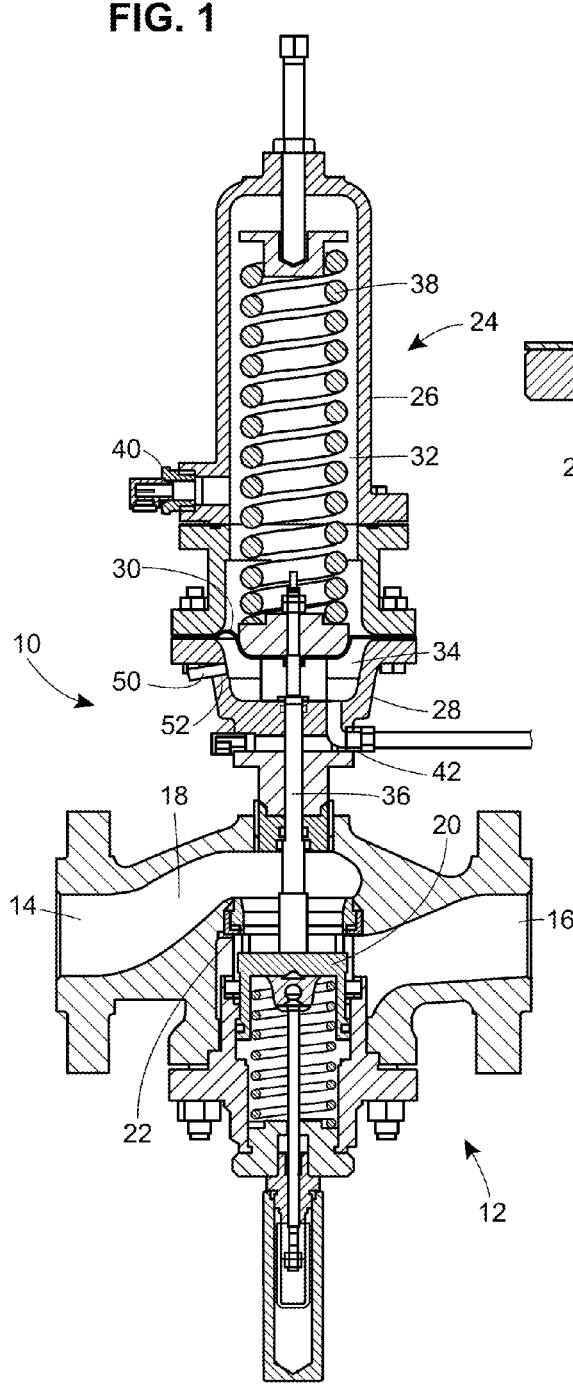
FIG. 1 is a cross-sectional view of a process fluid regulator assembled in accordance with the teachings of a first disclosed example of the present invention, an actuator of the process fluid regulator including a high pressure bleed air valve.

Referring more specifically now to the drawings, FIG. 1 illustrates a process fluid regulator 10 assembled in accordance with the teachings of a first disclosed example of the present invention. The process fluid regulator 10 includes a regulator body 12 having a fluid inlet 14 and a fluid outlet 16 connected by a fluid flow path 18. A control element, such as a plug 20, is positioned in the fluid flow path and cooperates with a seat 22 to control the flow of process fluid through the regulator body 12.

An actuator 24 is attached to the regulator body 12, the actuator 24 providing force to move the plug 20 relative to the seat 22. The actuator 24 includes an upper housing 26 and a lower housing 28. A diaphragm 30 is located between the upper housing 26 and the lower housing 28, the diaphragm 30 separating the actuator 24 into an upper chamber 32 and a lower chamber 34. The diaphragm 30 is connected to the plug 20 by an actuator stem 36 so that the plug 20 moves in conjunction with the diaphragm 30. A biasing element, such as a control spring 38, may be located in the upper housing 26, the control spring 38 biasing the diaphragm 30 downward in FIG. 1, towards the seat 22. By biasing the diaphragm 30 towards the seat 22, the plug 20 is biased away from the seat 22 (because the plug is located below the seat 22) and into an open position, which allows process fluid to flow through the regulator body 12. In other embodiments, the spring 30 may be located in the lower chamber 34. Regardless, the plug 20 is ultimately positioned based upon a varying process fluid pressure in the lower chamber 34. For example, as process fluid pressure in the lower chamber 34 overcomes spring force from the spring 38, the diaphragm 30 moves upwards, away from the seat 22, thus moving the plug 20 towards a closed position. To the contrary, as process fluid pressure in the lower chamber 34 decreases below the spring force, the diaphragm 30 moves downward, towards the seat 22, which moves the plug 20 towards an open position.

When the process fluid flowing through the regulator body 12 is a liquid flowing at a high pressure, the process liquid is directed into the lower chamber 34 as part of a feedback input to the lower chamber 34. High pressure process liquid produces a relatively large force on the diaphragm 30 within the actuator 24. Because gas is generally compressible at most operating pressures, any gas trapped within the lower chamber 34 may hinder the ability of process liquid to move the diaphragm 30 by limiting the volume in the lower chamber 34 that is available for process liquid by becoming trapped between the process liquid and the diaphragm 30. When this happens, the actuator 24 may lose some effectiveness. Regulators installed in generally upright orientations, such as the orientation shown in FIGS. 1 and 2 where the actuator 24 is located above the regulator body 12, cause the most problems with trapped gas. Trapped gas can also become a problem in the upper chamber 32 in certain orientations and the high pressure bleed air valve described herein can also be used to purge trapped gas in an upper chamber if desired.

An upper vent 40 may form a fluid passageway into, and out of, the upper chamber 32 to allow fluid (e.g., ambient air) to enter and exit the upper chamber 32 as a result of changing volume of the upper chamber 32 when the diaphragm 30 moves. As discussed above, process fluid (especially process liquid) may be introduced into the lower chamber 34 through a lower control inlet 42. The lower control inlet 42 forms part of a process fluid passageway between the lower chamber 32 and process fluid in the fluid exit 16, or downstream of the fluid exit 16. By varying process fluid pressure in the lower chamber 34, the actuator 24 controls a position of the plug 20 relative to the seat 22.

Any residual gas present in the lower chamber 34 may become trapped within the lower chamber 34 if the actuator 24 is mounted in an upright orientation, as is illustrated in FIG. 1. In order to purge residual gas from the lower chamber 34 a high pressure bleed valve 50 may be connected to an inlet tap 52 on the lower housing 28. Residual gas is purged from the lower chamber 34 through the high pressure bleed valve 50, which increases the volume available in the lower chamber 34 for process liquid. This increased volume, in turn, increases the actuator 24 effectiveness and response time.

Figure 2:
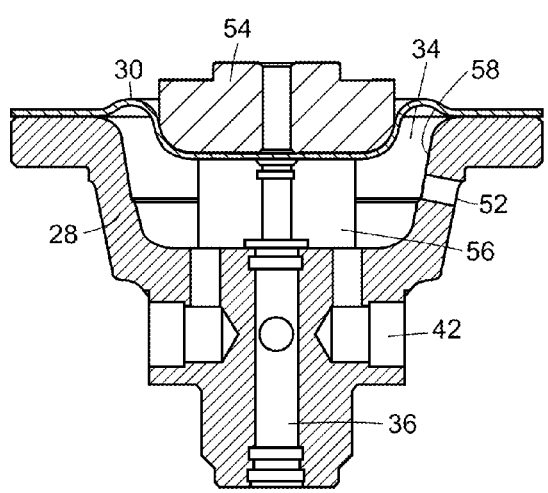
FIG. 2 is enlarged cross-sectional view of a lower chamber of the actuator of FIG. 1.

Turning now to FIG. 2, the lower housing 28 and lower chamber 34 are illustrated in greater detail. The diaphragm 30 is located near the top of the lower chamber 34, separating the lower chamber 34 from the upper chamber 32. The diaphragm 30 may be attached to the stem 36 with a diaphragm plate 54 and a diaphragm head 56, the diaphragm 30 being trapped between the diaphragm plate 54 and the diaphragm head 56. As discussed above, process liquid may be introduced into the lower chamber 34 through the lower control inlet 42. As process liquid enters the lower control liquid 42 and travels into the lower chamber 34, residual gas may become trapped between the incoming process liquid and the diaphragm 30. This residual gas may be purged through the high pressure control valve 50 (not shown in FIG. 2) located in the inlet tap 52 (see FIG. 1). In the embodiment of FIG. 2, the inlet tap 52 is located at an intermediate location on an inner wall 58 of the lower housing 28. The inner tap 52 may be located at a position where the diaphragm 30 will not roll over the inlet tap 52. If the diaphragm 30 were to roll over the inlet tap 52, the diaphragm 30 could become damaged or destroyed. The diaphragm head 56 may be sized to form a stop for the diaphragm 30, thereby preventing the diaphragm 30 from descending to a location where the diaphragm 30 could possibly roll over the inlet tap 52. In some embodiments, a thickness of the diaphragm head 56 may be approximately 75% of the distance between a bottom of the lower housing 28 and a top of the lower housing 28. When the diaphragm head 56 contacts the bottom of the lower housing 28, the diaphragm 30 is prevented from further downward travel. In other embodiments, a stop could be formed on the actuator stem 36 or other structure within the actuator 24 or regulator body 12.

Figure 3:
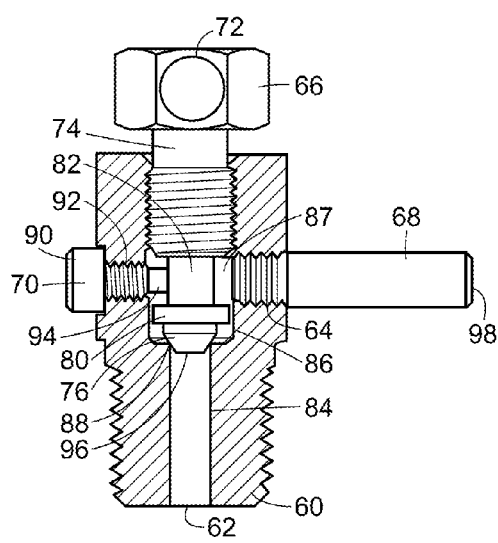
FIG. 3 is enlarged cross-sectional view of a high pressure bleed valve that may be attached to the lower chamber of FIG. 2.

Turning now to FIG. 3, one embodiment of the high pressure bleed valve 50 is illustrated. The high pressure bleed valve 50 may include an inlet tap plug 60 having a central bore 62 and a transverse bore 64, a vent screw 66 at least partially disposed in one end of the central bore, a vent tube 68 at least partially disposed within one end of the transverse bore 64, and a back stop screw 70 disposed in another end of the transverse bore 64. The vent tube 68 may be generally hollow, forming a fluid flow path with the transverse bore 64 and the central bore 62 capable of directing purged gas from the lower chamber 34 to the atmosphere, or to a collection container (not shown). The vent screw 66 cooperates with the central bore 62 to restrict or allow fluid flow through the inlet tap plug 60 and vent tube 68.

The vent screw 66 may include a head portion 72 connected to a shank 74, at least a portion of the shank 74 being externally threaded, and a plug 76 connected to the shank 74 at an opposite end from the head portion 72. The plug 76 may be generally conically-shaped having a narrow or cone-shaped portion 96 at a distal end. An annular flange 80 may extend radially outward from the shank 74 at a location between the plug 76 and the threaded portion. The portion of the shank 74 between the threaded portion and the annular flange 80 forms a recessed area 82.

The central bore 62 may include a first portion 84 having a first diameter and a second portion 86 having a second diameter, the first diameter being less than the second diameter. A junction between the first portion 84 and the second portion 86 forms an annular shoulder 88. The annular shoulder 88 cooperates with the plug 76 to control fluid flow through the central bore 62 and the transverse bore 64. The second portion 86 of the central bore 62 forms a chamber 87 in a fluid flow path between the lower chamber 34 of the actuator 24 and the vent tube 68 when the high pressure bleed valve 50 is attached to the lower actuator housing 28 and the plug 76 on the vent screw 66 is spaced from the annular shoulder 88.

The back stop screw 70 includes a head portion 90, an externally threaded shank 92 that terminates in a reduced diameter end 94. The reduced diameter end 94 may be located within the recessed area 82 to prevent unintentional loss of the vent plug 66. In one embodiment, the reduced diameter end 94 may have a thickness that is approximately one half the thickness of the recessed area 82.

The inlet tap plug 60 may include external threads at one end that cooperate with internal threads (not shown) in the inlet tap 52. When the inlet tap plug 60 is secured within the inlet tap 52, the vent tube 68 may be positioned so that an exit 98 is aimed downward, away from the upper hosing 26 to direct purged gas away from any personnel that may be in the area.

By selectively positioning the vent screw 66 within the central bore 62 residual gas within the lower chamber 34 may be purged, thereby increasing the available volume of the second chamber, and thus, the effectiveness and responsiveness of the actuator 24.

During testing of one embodiment of the regulator with bleed valve described above, it was found that when the actuator was mounted upside down, approximately 188.8 ml were available for control fluid in the lower chamber. When mounted upright, but without the bleed valve, the available volume in the bottom chamber dropped to only approximately 15.8 ml. However, when the bleed valve was installed in the regulator that was mounted upright, the available volume in the lower chamber increased to approximately 76.8 ml, an almost five-fold increase in available volume.

In one or more of the foregoing examples, the description uses terms such as upper, lower, inwardly and/or outwardly. These terms are relative only and are to be used in the context of describing the exemplary embodiments when positioned as shown in the Figures. Those of skill in the art will readily understand that valves may be positioned in different orientations than those shown in the Figures, and those of skill in the art can readily understand how to adapt these relative terms to alternate orientations of the subject control valves.

While the high pressure bleed valve has been described with respect to certain embodiments thereof, it will be understood by persons of ordinary skill in the art that the appended claims are not intended to be limited thereto, and that modifications can be made that are considered within the scope of the claims.

What is claimed:

1. A process fluid regulator comprising:
    a regulator body having a fluid inlet and a fluid outlet connected by a fluid flow path;
    a control element disposed within the fluid flow path, the control element cooperating with a seat to control a flow of process fluid through the regulator body;
    an actuator attached to the regulator body, the actuator having an upper housing and a lower housing, a diaphragm disposed within the actuator and dividing the actuator into an upper chamber and a lower chamber;
    an actuator stem connected to the diaphragm and to the control element; and
    a high pressure bleed valve attached to the lower chamber, the high pressure bleed valve forming a fluid passageway with the lower chamber to vent residual gas from the lower chamber,
    wherein the high pressure bleed valve includes an inlet tap plug having a central bore and a transverse bore, and a vent screw at least partially disposed on the central bore, a vent tube at least partially disposed in one end of the transverse bore, and a back stop screw at least partially disposed in another end of the transverse bore, the vent screw including a plug at one end, the plug cooperating with a shoulder formed in the central bore to control fluid flow through the central bore.

2. The process fluid regulator of claim 1, wherein the high pressure bleed valve is connected to an inlet tap located in the lower chamber.

3. The process fluid regulator of claim 2, wherein the inlet tap is located at an intermediate position within the lower chamber so that the diaphragm cannot roll over the inlet tap.

4. The process fluid regulator of claim 1, wherein the bleed valve includes a vent tube that is oriented away from the upper chamber.

5. The process fluid regulator of claim 1, wherein the vent tube is hollow and forms a fluid flowpath for fluid to flow out of the lower chamber.

6. The process fluid regulator of claim 1, wherein the vent screw controls fluid flow out of the vent tube.

7. The process fluid regulator of claim 6, wherein the vent screw includes an annular flange extending outward between the plug and a head of the vent screw.

8. The process fluid regulator of claim 7, wherein a recessed area is formed on a shank of the vent screw between the annular flange and the head.

9. The process fluid regulator of claim 8, wherein the back stop screw includes a reduced diameter end, the reduced diameter end being located at least partially within the recessed area.

10. The process fluid regulator of claim 8, wherein the reduced diameter end is ½ the size of the recessed area.

11. The process fluid regulator of claim 1, wherein the diaphragm is connected to the actuator stem with a diaphragm plate and a diaphragm head, the diaphragm being at least partially located between the diaphragm plate and the diaphragm head.

12. The process fluid regulator of claim 11, wherein the diaphragm head forms a stop that limits movement of the diaphragm towards the seat so that the diaphragm is prevented from rolling over the inlet tap.

13. The process fluid regulator of claim 12, wherein the diaphragm head has a thickness that is 75% of the distance between an upper end of the lower chamber and a lower end of the lower chamber.

14. The process fluid regulator of claim 1, wherein the upper chamber includes a vent and the lower chamber includes a lower control inlet, the vent forming a fluid flow path into, and out of, the upper chamber and the lower control inlet forming a fluid flow path into, and out of, the lower chamber, the lower control inlet fluidly connecting the lower chamber with process fluid downstream of the control element.

* * * * *

UNITED STATES PATENT AND TRADEMARK OFFICE
CERTIFICATE OF CORRECTION

| | | |
|---|---|---|
| PATENT NO. | : 9,104,208 B2 | Page 1 of 1 |
| APPLICATION NO. | : 13/558960 | |
| DATED | : August 11, 2015 | |
| INVENTOR(S) | : Ernesto Vasquez et al. | |

It is certified that error appears in the above-identified patent and that said Letters Patent is hereby corrected as shown below:

In the Specification:

At Column 3, line 35, "spring 30" should be -- spring 38 --.

At Column 4, line 5, "lower chamber 32" should be -- lower chamber 34 --.

At Column 5, line 31, "hosing" should be -- housing --.

Signed and Sealed this
Twenty-sixth Day of July, 2016

Michelle K. Lee
*Director of the United States Patent and Trademark Office*